(12) United States Patent
Nakagawa et al.

(10) Patent No.: US 10,779,531 B2
(45) Date of Patent: Sep. 22, 2020

(54) INSECT REPELLENT

(71) Applicant: Kao Corporation, Chuo-ku, Tokyo (JP)

(72) Inventors: Takao Nakagawa, Tokyo (JP); Kouhei Takeuchi, Tokyo (JP); Ryouta Koizumi, Bangkok (TH)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 15/552,117

(22) PCT Filed: Feb. 23, 2016

(86) PCT No.: PCT/JP2016/055256
§ 371 (c)(1),
(2) Date: Aug. 18, 2017

(87) PCT Pub. No.: WO2016/136735
PCT Pub. Date: Sep. 1, 2016

(65) Prior Publication Data
US 2018/0042225 A1 Feb. 15, 2018

(30) Foreign Application Priority Data

Feb. 26, 2015 (JP) ................ 2015-036217
Feb. 26, 2015 (JP) ................ 2015-036218
Mar. 18, 2015 (JP) ................ 2015-055178

(51) Int. Cl.
*A01N 31/02* (2006.01)
*A01N 35/02* (2006.01)
(Continued)

(52) U.S. Cl.
CPC ............. *A01N 31/02* (2013.01); *A01N 31/04* (2013.01); *A01N 31/16* (2013.01); *A01N 35/02* (2013.01);
(Continued)

(58) Field of Classification Search
CPC .......... A61Q 13/00; A61Q 5/02; A61Q 19/10; A61Q 15/00; A61Q 19/00; A61Q 5/12; A61Q 11/00; A61Q 19/007; A61Q 5/00; A61Q 17/04; A61Q 17/02; A61Q 19/04; A61Q 19/08; A61Q 19/001; A61Q 17/00; A61Q 17/005; A61Q 1/12; A61Q 1/14; A61Q 5/06; A61Q 5/10; A01N 27/00; A01N 49/00; A01N 25/18; A01N 25/28; A01N 31/16; A01N 25/04; A01N 25/10; A01N 25/24; A01N 65/00; A01N 65/08; A01N 65/22; A01N 65/26; A01N 25/00; A01N 31/02; A01N 31/04; A01N 35/02; A01N 35/04; A01N 35/06; A01N 37/02; A01N 37/06; A01N 37/08; A01N 37/10; A01N 43/08; A01N 43/16; A01N 43/22; A01N 43/40; A01N 43/42; A01N 43/78; C11D 3/505; C11D 3/50; C11D 17/0039; C11D 3/001; C11D 17/042; C11D 3/0068; C11D 1/72; C11D 3/3726; C11D 11/0023; C11D 17/0047; C11D 17/06; C11D 1/22; C11D 3/0015; C11D 3/0026; C11D 3/2093; C11D 3/222; C11D 3/225; C11D 3/30; C11D 3/373; C11D 3/3753; C11D 3/38; C11D 3/43; C11D 7/266; C11D 11/0017; C11D 17/0013; C11D 17/0017; C11D 17/0056; C11D 17/0091; C11D 17/043; C11D 17/045; C11D 17/046; C11D 17/047; C11D 1/02; C11D 1/146; C11D 1/29; C11D 1/66; C11D 1/662; C11D 3/046; C11D 3/08; C11D 3/124; C11D 3/2072; C11D 3/2082; C11D 3/2086; C11D 3/22; C11D 3/221; C11D 3/226; C11D 3/26;
(Continued)

(56) References Cited

U.S. PATENT DOCUMENTS 4,764,367 A    8/1988   Wilson et al.
5,576,010 A *   11/1996   Warren .................. A01N 31/04
                                                                            424/408
(Continued)

FOREIGN PATENT DOCUMENTS

CN      101287822 A    10/2008
CN      103987258 A     8/2014
(Continued)

OTHER PUBLICATIONS

Innocent, Ester et al., "Constitutents of the essential oil of Suregada zanzibariensis leaves are repellent to the mosquito", Anopheles gambiae s.s., Journal of Insect Science, 2010, vol. 10, Article 57, pp. 1-8, ISSN 1536-2442 (Year: 2010).*

(Continued)

*Primary Examiner* — Audrea B Coniglio
(74) *Attorney, Agent, or Firm* — Sterne, Kessler, Goldstein & Fox P.L.L.C.

(57) ABSTRACT

Provided is an insect repellent having excellent repellent activity and being highly safe. An insect repellent comprising, as an active ingredient, at least one compound selected from the group consisting of octahydro-7-methyl-1,4-methanonaphthalen-6(2H)-one, 3-methyl-5-propyl-2-cyclohexen-1-one, octahydro-5-methoxy-4,7-methane-1H-indene-2-carboxaldehyde, 6-methylquinoline, phenoxyacetaldehyde, γ-octalactone, 9-ethylidene-3-oxatricyclo(6.2.1.0$^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one and 2,6,6-trimethylcyclohexa-1,3-diene-1-carbaldehyde.

13 Claims, No Drawings

(51) Int. Cl.
*A01N 35/06* (2006.01)
*A01N 43/16* (2006.01)
*A01N 43/78* (2006.01)
*A01N 43/08* (2006.01)
*A01N 35/04* (2006.01)
*A01N 43/40* (2006.01)
*A01N 43/22* (2006.01)
*A01N 31/04* (2006.01)
*A01N 31/16* (2006.01)
*A01N 37/02* (2006.01)
*A01N 37/06* (2006.01)
*A01N 37/08* (2006.01)
*A01N 37/10* (2006.01)
*A01N 43/12* (2006.01)
*A01N 43/42* (2006.01)

(52) U.S. Cl.
CPC ............ *A01N 35/04* (2013.01); *A01N 35/06* (2013.01); *A01N 37/02* (2013.01); *A01N 37/06* (2013.01); *A01N 37/08* (2013.01); *A01N 37/10* (2013.01); *A01N 43/08* (2013.01); *A01N 43/16* (2013.01); *A01N 43/22* (2013.01); *A01N 43/40* (2013.01); *A01N 43/42* (2013.01); *A01N 43/78* (2013.01)

(58) Field of Classification Search
CPC ....... C11D 3/33; C11D 3/3703; C11D 3/3707; C11D 3/3719; C11D 3/3723; C11D 3/3742; C11D 3/761; C11D 3/3769; C11D 3/3773; C11D 3/378; C11D 3/3942; C11D 3/40; C11D 7/264; C11D 9/22; A61K 8/11; A61K 8/84; A61K 2800/412; A61K 8/34; A61K 8/731; A61K 8/35; A61K 8/37; A61K 2800/10; A61K 2800/56; A61K 8/33; A61K 8/8152; A61K 8/922; A61K 8/87; A61K 2800/262; A61K 2800/624; A61K 8/04; A61K 8/042; A61K 8/8158; A61K 2300/00; A61K 2800/805; A61K 31/425; A61K 8/31; A61K 8/342; A61K 8/345; A61K 8/4973; A61K 8/8111; A61K 2800/42; A61K 2800/48; A61K 31/4155; A61K 36/67; A61K 36/81; A61K 8/27; A61K 8/347; A61K 8/365; A61K 8/498; A61K 8/8117; A61K 8/8141; A61K 8/891; A61K 8/894; A61K 8/96; A61K 8/9789; A61K 9/0014; A61K 2800/242; A61K 47/22; A61K 8/044; A61K 8/375; A61K 8/40; A61K 8/645; A61K 8/732; A61K 8/8129; A61K 2800/244; A61K 2800/30; A61K 2800/33; A61K 2800/413; A61K 2800/49; A61K 2800/542; A61K 2800/5424; A61K 2800/5426; A61K 2800/57; A61K 2800/592; A61K 2800/63; A61K 2800/874; A61K 31/045; A61K 31/381; A61K 31/415; A61K 31/515; A61K 45/06; A61K 47/08; A61K 8/068; A61K 8/19; A61K 8/361; A61K 8/411; A61K 8/42; A61K 8/44; A61K 8/4913; A61K 8/4926; A61K 8/4946; A61K 8/4966; A61K 8/8147; A61K 8/8164; A61K 8/817; A61K 8/8176; A61K 8/8182; A61K 8/8188; A61K 8/85; A61K 8/898; A61K 8/9761; A61K 8/9794; A61K 9/007; A61K 9/5031; A61K 9/5089
See application file for complete search history.

(56) References Cited

U.S. PATENT DOCUMENTS

| 5,721,274 | A | 2/1998 | Vander Meer et al. |
| 5,855,903 | A | 1/1999 | Warren et al. |
| 6,740,713 | B1 | 5/2004 | Busch et al. |
| 8,921,303 | B1* | 12/2014 | Lull ........................ A61L 9/013 |
| | | | 512/2 |
| 2003/0104969 | A1* | 6/2003 | Caswell ................... A47F 1/08 |
| | | | 510/513 |
| 2003/0125220 | A1* | 7/2003 | Dykstra ................... A61K 8/37 |
| | | | 510/101 |
| 2005/0187289 | A1* | 8/2005 | Dolan ..................... A01N 27/00 |
| | | | 514/457 |
| 2009/0253601 | A1* | 10/2009 | Tan ........................ C11D 3/2079 |
| | | | 510/145 |
| 2010/0152264 | A1 | 6/2010 | Herrmann et al. |
| 2012/0232160 | A1 | 9/2012 | Kaufman et al. |
| 2014/0308328 | A1 | 10/2014 | Saguchi et al. |
| 2014/0328790 | A1 | 11/2014 | Saguchi et al. |
| 2014/0357707 | A1 | 12/2014 | Ishibashi et al. |
| 2015/0051276 | A1 | 2/2015 | Bedoukian |
| 2015/0126437 | A1 | 5/2015 | Ray et al. |
| 2017/0079274 | A1 | 3/2017 | Ray et al. |
| 2019/0082690 | A1 | 3/2019 | Bedoukian |

FOREIGN PATENT DOCUMENTS

| CN | 104334021 A | 2/2015 | |
| JP | 61-015041 A | 4/1986 | |
| JP | 63-048203 A | 2/1988 | |
| JP | 64-38003 A | 2/1989 | |
| JP | 2002-173407 A | 6/2002 | |
| JP | 2003-504350 A | 2/2003 | |
| JP | 2003-313174 A | 11/2003 | |
| JP | 2004-196727 A | 7/2004 | |
| JP | 2006-001864 A | 1/2006 | |
| JP | 2010-527990 A | 8/2010 | |
| JP | 2010-275264 A | 12/2010 | |
| JP | 2013-040132 A | 2/2013 | |
| JP | 2013-139431 A | 7/2013 | |
| JP | 2013-177342 A | 9/2013 | |
| JP | 2018-029836 A | 3/2018 | |
| JP | 2018-035095 A | 3/2018 | |
| WO | WO00/27197 | * 11/1998 | ............ A01N 43/04 |
| WO | WO 00/27197 A1 | 5/2000 | |
| WO | WO 2013/001368 A2 | 1/2013 | |
| WO | WO 2013/059364 A2 | 4/2013 | |
| WO | WO-2013059364 A2 * | 4/2013 | ............ A01N 37/18 |
| WO | WO 2013/165476 A1 | 11/2013 | |
| WO | WO 2013/165479 A1 | 11/2013 | |
| WO | WO 2014/140314 A2 | 9/2014 | |

OTHER PUBLICATIONS

Innocent, E. et al., "Constituents of the essential oil of Suregada zanzibariensis leaves are repellent to the mosquito, *Anopheles gannbia* s.s.," J. Insect Sci., 2010; 10: 57. doi: 10.1673/031.010.5701, pub online Jun. 9, 2010, Entomological Society of America, Annapolis, MD. Cited in IDS dated Oct. 18, 2017. (Year: 2010).*
International Search Report (ISR) for PCT/JP2016/055256; I.A. fd: Feb. 23, 2016, dated May 24, 2016 from the Japan Patent Office, Tokyo, Japan.
International Preliminary Report on Patentability (IPRP), Chapter I of the Patent Cooperation Treaty, including the Written Opinion for PCT/JP2016/055256; I.A. fd: Feb. 23, 2016, dated Aug. 29, 2017, by the International Bureau of WIPO, Geneva, Switzerland.
Manzoor, F et al., "Chemical Composition of Essential Oils Derived from Eucalyptus and Lemongrass and Their Antitermitic Activities Angainst *Microtermes mycophagus* (Desneux)," Asian Journal of Chemistry; vol. 25, No. 5 (2013), 2405-2408, dx.doi.org/10.14233/ajchem.2013.13335, Asian Publication Corporation, Ghaziabad, India.
Innocent, E et al., "Constituents of the essential oil of *Suregada zanzibariensis* leaves are repellent to the mosquito, *Anopheles*

(56) References Cited

OTHER PUBLICATIONS

*gambiae* s.s.," J Insect Sci. 2010;10:57. doi: 10.1673/031.010.5701, pub online Jun. 9, 2010, Entomological Society of America, Annapolis, MD.

Xue, Feiqun et al, "Determination of repellency of aromatic carboxylic acid derivatives to housefly in relationship to quantitative structure activity," Scientia Agricultura Sinica (Zhongguo Nongye Kexue), 1997, vol. 30, No. 1, pp. 77-83, ISSN 0578-1752, Beijing, China.

* cited by examiner

INSECT REPELLENT

FIELD OF THE INVENTION

The present invention relates to an insect repellent having insect repellent activity.

BACKGROUND OF THE INVENTION

Most hematophagous insects cause infections among humans and animals via transmission of a pathogen, or cause skin inflammation. In particular, mosquitoes carry serious diseases, such as Dengue fever, Zika fever, yellow fever, encephalitis, and malaria, to humans, and are thus hygienically very harmful insects.

Such insects each have an excellent chemoreception system including a heat sensor to sense the body temperature of an animal, a taste receptor to sense taste, an olfactory receptor to sense volatile substances such as body odor, and a carbon dioxide receptor to sense carbon dioxide, which is a highly-volatile substance, and exhibit a wide variety of behaviors. For example, female mosquitoes before oviposition are known to trace carbon dioxide exhaled from an animal and the body odor to approach the animal for the blood, detect the targeted animal by sensing the body temperature with the heat sensor, and suck the blood.

In recent years, a means to repel such insects has been devised which causes a change to the chemoreception system of the insect to disable the cognitive sense of the insect, and substances acting on the olfactory receptor, such as N,N-diethyl-3-methylbenzamide (DEET) and p-menthane-3,8-diol (PMD), have been used as a repellent.

However, DEET is disadvantageous in that it has uncomfortable odor, and use of it for infants and individuals with sensitive skin is restricted because of the high skin permeability, and the duration time is limited to 2 to 3 hours.

While natural essential oils such as lemon eucalyptus oil, lemongrass oil, orange oil, and cassia oil are reported, for example, to have insect-repelling effect (e.g., Patent Literature 1), however, the repelling effect is not necessarily satisfactory, and thus insufficient for practical use.

PATENT LITERATURE

[Patent Literature 1] JP-A-2002-173407

SUMMARY OF THE INVENTION

The present invention relates to the following 1) to 15).

1) An insect repellent comprising, as an active ingredient, at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo($6.2.1.0^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde.

2) A thermoreception inhibitor for an insect, comprising, as an active ingredient, at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo($6.2.1.0^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde.

3) An insect repellent comprising, as active ingredients, the compound defined in 1) and a fragrance compound having carbon dioxide response-inhibiting action.

4) A method for repelling an insect, the method comprising applying at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo($6.2.1.0^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde onto the skin of a mammal.

5) A method for repelling an insect, the method comprising applying the compound defined in 4) and a fragrance compound having carbon dioxide response-inhibiting action onto the skin of a mammal.

6) A method for repelling an insect, the method comprising allowing at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo($6.2.1.02,7$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde to attach or be held on an apparel article directly or indirectly contacting a skin.

7) A method for repelling an insect, the method comprising allowing the compound defined in 6) and a fragrance compound having carbon dioxide response-inhibiting action to attach or be held on an apparel article directly or indirectly contacting a skin.

8) A method for repelling an insect, the method comprising spreading at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo($6.2.1.02,7$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde in a defined space.

9) A method for repelling an insect, the method comprising spreading the compound defined in 8) and a fragrance compound having carbon dioxide response-inhibiting action in a defined space.

10) Use of at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.02,7)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde for producing an insect repellent.

11) Use of the compound defined in 10) and a fragrance compound having carbon dioxide response-inhibiting action far producing an insect repellent.

12) Use of at least one compound selected from the group consisting of octahydro-7-methyl-1,4-methanonaphthalen-6 (2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.02,7)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde for producing a thermoreception inhibitor for an insect.

13) Use of at least one compound selected from the group consisting of octahydro-7-methyl-1,4-methanonaphthalen-6 (2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.0.2,7)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde for repelling an insect.

14) Use of the compound defined in 13) and a fragrance compound having carbon dioxide response-inhibiting action for repelling an insect.

15) Use of at least one compound selected from the group consisting of octahydro-7-methyl-1,4-methanonaphthalen-6 (2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.02,7)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde for inhibiting the thermoreception of an insect.

DETAILED DESCRIPTION OF THE INVENTION

The present invention relates to providing an insect repellent having excellent repellent activity and being highly safe.

The present inventors searched for a material capable of inhibiting the thermal response of an insect, and found that specific fragrance compounds have excellent thermoreception-inhibiting effect and are useful for an insect repellent, and further found that use of the compound in combination with a fragrance compound having carbon dioxide response-inhibiting action can inhibit the seeking behavior of an insect for humans, and is thus more useful for an insect repellent.

The present invention can provide an insect repellent which exhibits excellent repelling effect by inhibition of the thermoreception response of an insect on the basis of a mechanism different from those of common repellents such as DEET and PMD, and is highly safe.

Each of octahydro-7-methyl-1,4-methanonaphthalen-6 (2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo($6.2.1.0^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde in the present invention (hereinafter, also referred to as "the compound according to the present invention") is a compound known as a fragrance, and commercially available as follows.

3-methyl-5-propyl-2-cyclohexen-1-one (GRAVENONE): Symrise AG octahydro-5-methoxy-4,7-methano-1H-indene-2-carboxaldehyde ("SCENTENAL" (registered trademark)): Firmenich SA phenoxyacetaldehyde: International Flavors & Fragrances (IFF) Inc.

γ-octalactone: Sigma-Aldrich Co., LLC.

9-ethylidene-3-oxatricyclo($6.2.1.0^{2,7}$)undecan-4-one ("FLOREX" (registered trademark)): Firmenich SA octahydro-7-methyl-1,4-methanonaphthalen-6(2H)-one (PLICATONE): Firmenich SA 2,3,3-trimethyl-2H-inden-1-one ("SAFRALEINE" (registered trademark)): Givaudan SA 4-methyl-5-thiazoleethanol: Sigma-Aldrich Co., LLC.

7-methoxy-3,7-dimethyloctanal: Innospec 3-methyl-1-phenyl-3-pentanol: Tokyo Chemical Industry Co., Ltd.

2-phenylpropionaldehyde dimethyl acetal: Sigma-Aldrich Co., LLC.

octahydro-2H-1-benzopyran-2-one (octahydrocoumarin): Takasago International Corporation, International Flavors & Fragrances (IFF) Inc.

2,6,6-trimethylcyclohexa-1,3-diene-1-carbaldehyde ("safranal"): Givaudan SA 6-methylquinoline: Tokyo Chemical Industry Co., Ltd.

One of these compounds according to the present invention may be used singly, or two or more thereof may be used in a mixture.

From the viewpoint of insect-repelling effect and feeling of use, for example, preferred compounds among the compounds according to the present invention are octahydro-7-methyl-1,4-methanonaphthalen-6(2H)-one (PLICATONE): Firmenich SA, 3-methyl-5-propyl-2-cyclohexen-1-one (GRAVENONE), and 6-methylquinoline.

The compound according to the present invention may be used in combination with a fragrance compound having carbon dioxide response-inhibiting action.

Here, "carbon dioxide response-inhibiting" refers to inhibiting the seeking behavior of an insect for a carbon dioxide source by disabling or reducing the response of the insect to carbon dioxide reception to control the cognitive sense to carbon dioxide. The carbon dioxide response of an insect can be measured through investigation of a nerve firing pattern of the sensory hair with electrodes inserted therein in response to a carbon dioxide stimulus by using known single sensillum recording (Nature 461, 277-281 (10 Sep. 2009)).

Examples of fragrance compounds having carbon dioxide response-inhibiting action include compounds listed in Reference Example below, specifically, 2-methoxy-4-propylphenol, 2-isopropyl-4-methylthiazol, isocyclocitral, 9-decen-1-ol, 1-octen-3-ol, 1-decanol, ethyl 2-ethylhexanoate, trans-2-hexenyl acetate, ethyl 2-cyclohexylpropionate, ethyl phenylacetate, 2,4,6-trimethyl-3-cyclohexene-1-methanol, 1-octanol, 2,4-dimethylcyclohex-3-ene-1-methanol, o-tert-butylcyclohexyl acetate, 2-methylbutyric acid, benzyl propionate, 3-methyl-2-pentylcyclopent-2-en-1-one, and cis-3-hexenyl acetate. Among them, 2,4-dimethylcyclohex-3-ene-1-methanol (floralol), 1-octanol, cis-3-hexenyl acetate, etc., are preferred, and 2,4-dimethylcyclohex-3-ene-1-methanol is more preferred.

The insect intended in the present invention is not limited and may be any insect having a thermoreception response system, and the insect may be hematophagous or non-hematophagous. Example of such insects include mosquitoes such as northern house mosquitoes, *Culex tritaeniorhynchus*, yellow fever mosquitoes, Asian tiger mosquitoes, and Chinese malaria mosquitoes; flies such as houseflies, false stable flies, little house flies, blow flies, flesh flies, seed-corn flies, onion flies, fruit flies, vinegar flies, moth flies, and tsetse flies; horseflies; black flies; stable flies; biting midges; and chironomids. Among them, mosquitoes, flies, black flies, and stable flies are preferred.

As demonstrated in Examples later, the compound according to the present invention inhibits the thermoreception system of an Asian tiger mosquito. Thus, the compound according to the present invention can serve as an insect repellent or serve for inhibition of the thermoreception of an insect, and can be used for producing an insect repellent or thermoreception inhibitor. In other words, the compound according to the present invention can be used for repelling an insect and inhibiting the thermoreception. In addition, use of the compound according to the present invention in combination with a fragrance compound having carbon dioxide response-inhibiting action effectively inhibits the seeking behavior of an Asian tiger mosquito for humans, and thus such combined use provides a more excellent insect repellent and is useful for repelling an insect, especially, repelling a mosquito.

Here, "repelling an insect" refers to preventing an insect from approaching to an object or forcing an insect to avoid an object, and "inhibiting the thermoreception of an insect" refers to inhibiting the seeking behavior of an insect for a heat source by disabling or reducing the thermoreception response of the insect to inhibit the cognitive sense to the heat source, and the concept differs from having insecticidal ability to exterminate an insect.

For determination of thermoreception, insects are released into a cage with which a heat source such as a plate heater is provided and the number of insects attracted to the heat source is counted.

The insect repellent or thermoreception inhibitor according to the present invention can repel an insect, for example, through applying it onto the skin of a mammal such as a human, allowing it to attach or be held on an apparel article directly or indirectly contacting the skin, such as a cloth and an accessory, or spreading (including evaporating and volatilizing) it in a defined space such as a room interior and a car interior, and can be appropriately blended with additional components such as a solvent and an additive for formulation into a composition to prepare a formulation. Alternatively, the insect repellent or thermoreception inhibitor according to the present invention may be used for a material for imparting insect repellent activity to an external preparation for cutaneous administration, a cleaning agent, a skin cosmetic, a hair cosmetic, a textile softener, a fabric treatment agent, or the like.

The amount of the compound according to the present invention to be blended in the above composition is preferably 0.001% by mass or more, more preferably 0.01% by mass or more, even more preferably 0.1% by mass or more and preferably 80% by mass or less, more preferably 40% by mass or less, even more preferably 10% by mass or less, or preferably from 0.001 to 80% by mass, more preferably 0.01 to 40% by mass, even more preferably from 0.01 to 10% by mass, and further more preferably from 0.1 to 10% by mass, relative to the total amount of the composition, although it varies depending on the dosage form.

In the case that the compound according to the present invention is used in combination with a fragrance compound having carbon dioxide response-inhibiting action, the content of the fragrance compound in the composition is preferably 0.001% by mass or more, more preferably 0.01% by mass or more, even more preferably 0.1% by mass or more and preferably 8.0% by mass or less, more preferably 40% by mass or less, even more preferably 10 mass % or less, or preferably from 0.001 to 80% by mass, more preferably from 0.01 to 40% by mass, even more preferably from 0.01 to 10% by mass, and further more preferably from 0.1 to 10% by mass, relative to the total amount of the compound.

The type of a solvent or additive may be appropriately selected in accordance with the mode of use or intended use of the insect repellent or thermoreception inhibitor, and examples of the solvent include lower alcohols such as methanol, ethanol, and propanol; and water.

Examples of the additive include additives commonly used for various chemical products and cosmetics, specifically, surfactants, organic solvents, oily components, moisturizing agents, powders, solubilizers, thickeners, resins, cleaning agents, preservatives, UV absorbers, inorganic substances, fragrances, pigments, deodorants, essential oils, pharmaceutical agents, plant extracts, and other repellents.

The dosage form of the insect repellent or thermoreception inhibitor according to the present invention can be appropriately set in accordance with the mode of use, and may be any of a liquid, a cream, a lotion, an emulsion, a gel, an ointment, a powder, a granule, a spray, and an aerosol spray, etc.

In the case that the insect repellent or thermoreception inhibitor is spread in a defined space, it is suitable to employ a method in which the insect repellent or thermoreception inhibitor supported on a carrier or dissolved in a solvent is packed in a container with a liquid-absorbing wick and heated or evaporated through air blow, or a method in which the insect repellent or thermoreception inhibitor supported on a carrier is evaporated into the space at normal temperature. In this case, examples of carriers to support the insect repellent or thermoreception inhibitor include natural fibers such as pulp, cotton, wool, linen, and silk; synthetic fibers such as polypropylene, polyethylene, polyamide, polyethylene terephthalate, polybutylene terephthalate, polysulfone, rayon, methacrylic resin, and glass fiber; and porous materials such as zeolite, talc, white carbon, diatomaceous earth, lime, silica gel, and activated carbon.

Examples of the method for allowing the insect repellent or thermoreception inhibitor according to the present invention to attach or be held on an apparel article include, in addition to a method in which the insect repellent or thermoreception inhibitor is applied onto an intended article, a method in which the insect repellent or thermoreception inhibitor is blended in a textile softener and allowed to attach or be held in treatment with the softener, and a method in which a fabric base material which has been treated with the insect repellent or thermoreception inhibitor in advance to impart insect repellent activity is used for production of an intended article.

In relation to the above-described embodiments, the following modes are disclosed in the present invention.

<1> An insect repellent comprising, as an active ingredient, at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.0$^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde.

<2> A thermoreception inhibitor for an insect, comprising, as an active ingredient, at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.0$^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde.

<3> An insect repellent comprising, as active ingredients, the compound defined in <1> and a fragrance compound having carbon dioxide response-inhibiting action.

<4> The insect repellent according to <3>, wherein the fragrance compound having carbon dioxide response-inhibiting action is at least one selected from the group consisting of 2,4-dimethylcyclohex-3-ene-1-methanol, 1-octanol, and cis-3-hexenyl acetate.

<5> The insect repellent according to <3> or <4>, wherein the compound defined in <1> is octahydro-7-methyl-1,4-methanonaphthalen-6(2H)-one or 3-methyl-5-propyl-2-cyclohexen-1-one.

<6> The insect repellent according to <1>, <3>, <4>, or <5> or the thermoreception inhibitor for an insect according to <2>, wherein the insect is at least one selected from the group consisting of mosquitoes, flies, black flies, and stable flies.

<7> The insect repellent or thermoreception inhibitor for an insect according to <6>, wherein the insect is a mosquito.

<8> A method for repelling an insect, comprising applying at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.0$^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde onto the skin of a mammal.

<9> A method for repelling an insect, comprising applying the compound defined m <8> and a fragrance compound having carbon dioxide response-inhibiting action onto the skin of a mammal.

<10> The method for repelling an insect according to <9>, wherein the fragrance compound having carbon dioxide response-inhibiting action is at least one selected from the group consisting of 2,4-dimethylcyclohex-3-ene-1-methanol, 1-octanol, and cis-3-hexenyl acetate.

<11> The method for repelling an insect according to <9> or <10>, wherein the compound defined in <8> is octahydro-7-methyl-1,4-methanonaphthalen-6(2H)-one or 3-methyl-5-propyl-2-cyclohexen-1-one.

<12> Use of at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.02,7)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde for producing an insect repellent.

<13> Use of the compound defined in <12> and a fragrance compound having carbon dioxide response-inhibiting action for producing an insect repellent.

<14> Use of at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.0$^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde for producing a thermoreception inhibitor for an insect.

<15> Use of at least one compound selected from the group consisting of octahydro-7-methyl-1,4-methanonaphthalen-6(2H)-one, 3-methyl-5-propyl-2-cyclohexen-1-one, octahydro-5-methoxy-4,7-methane-1H-indene-2-carboxaldehyde, 6-methylquinoline, phenoxyacetaldehyde, γ-octalactone, 9-ethylidene-3-oxatricyclo(6.2.1.0$^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde for repelling an insect.

<16> Use of the compound defined in <15> and a fragrance compound having carbon dioxide response-inhibiting action for repelling an insect.

<17> Use of at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.0$^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde for inhibiting the thermoreception of an insect.

<18> The insect repellent or thermoreception inhibitor for an insect according to any one of <1> to <6>, wherein the content of octahydro-7-methyl-1,4-methanonaphthalen-6 (2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.0$^{2,7}$)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, or 2,6,6-trimethylcyclohexa-1,3-diene-1-carbaldehyde in the composition is preferably 0.001% by mass or more, more preferably 0.01% by mass or more, even more preferably 0.1% by mass or more and preferably 80% by mass or less, more preferably 40% by mass or less, even more preferably 10% by mass or less, or preferably from 0.001 to 80% by mass, more preferably from 0.01 to 40% by mass, even more preferably from 0.01 to 10% by mass, and further more preferably from 0.1 to 10% by mass.

<19> The insect repellent according to any one of <3> to <5>, wherein the content of the fragrance compound having carbon dioxide response-inhibiting action in the composition is preferably 0.001% by mass or more, more preferably 0.01% by mass or more, even more preferably % by mass or more and preferably 80% by mass or less, more preferably 40% by mass or less, even more preferably 10% by mass or less, or preferably from 0.001 to 80% by mass, more preferably from 0.01 to 40% by mass, even more preferably from 0.01 to 10% by mass, and further more preferably from 0.1 to 10% by mass, relative to the total amount of the composition.

<20> A method for repelling an insect, comprising attaching or holding at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.02,7)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde on an apparel article directly or indirectly contacting the skin.

<21> A method for repelling an insect, comprising spreading at least one compound selected from the group consisting of octahydro-7-methyl-1,4-methanonaphthalen-6(2H)-one, 3-methyl-5-propyl-2-cyclohexen-1-one, octahydro-5-methoxy-4,7-methano-1H-indene-2-carboxaldehyde, 6-methylquinoline, phenoxyacetaldehyde, γ-octalactone, 9-ethylidene-3-oxatricyclo(6.2.1.02,7)undecan-4-one, 2,3,3-trimethyl-2H-inden-1-one, 4-methyl-5-thiazoleethanol, 7-methoxy-3,7-dimethyloctanal, 3-methyl-1-phenyl-3-pentanol, 2-phenylpropionaldehyde dimethyl acetal, octahydro-2H-1-benzopyran-2-one, and 2,6,6-trimethylcyclohexa-1,3-diene-1-carbaldehyde in a defined space.

<22> A method for repelling an insect, comprising attaching or holding the compound defined in <20> and a fragrance compound having carbon dioxide response-inhibiting action on an apparel article directly or indirectly contacting the skin.

<23> A method for repelling an insect, comprising spreading the compound defined in <21> and a fragrance compound having carbon dioxide response-inhibiting action in a defined space such as a room interior or a car interior.

<24> In <13>, <16>, <22>, or <23>, the fragrance compound is at least one selected from the group consisting of 2,4-dimethylcyclohex-3-ene-1-methanol, 1-octanol, and cis-3-hexenyl acetate.

<25> In <13>, <16>, <22>, <23>, or <24>, the compound defined in <12>, the compound defined in <15>, the compound defined in <20>, or the compound defined in <21> is octahydro-7-methyl-1,4-methanonaphthalen-6(2H)-one or 3-methyl-5-propyl-2-cyclohexen-1-one.

EXAMPLES

Example 1

Evaluation of Thermoreception-Inhibiting Effect (1) Preparation of Asian Tiger Mosquitoes Asian tiger mosquitoes grown from eggs purchased from Sumika Technoservice Corporation were used. A transparent plastic pan was filled with water to a depth of approximately 1 cm, and a filter paper on which the eggs had been deposited was put therein. The larvae were fed with tropical fish feed (TetraMin) every day. After approximately 1 week, the pupae were collected with a dropper, and transferred into a 20 mL plastic cup, and the cup was placed in a netted cage. The adults were fed with 10% by mass sucrose contained in a 25 mL plastic tube. The males and females were kept together in one cage and allowed to mate for 5 days after eclosion. After 5 days of captivity, the adults were collected with an insect aspirator and anesthetized on ice for 5 minutes, and visually sorted into males and females to collect only the females.

(2) Evaluation of Inhibitory Effect on Seeking Behavior for Heat Source

Approximately 150 to 200 female Asian tiger mosquitoes were transferred in a plastic cage (30×30×30 cm). To monitor the behavior of the female mosquitoes from the top of the plastic cage, the top surface of the cage was replaced with an acrylic plate. A plate heater (multi-panel heater 16 W for small animals, manufactured by Vivaria) as a heat source was provided at a corner of the cage from the outside of the mesh with an area of 5×3 cm exposed. To take a photograph of the heat source from the top surface in experiment, a video camera (manufactured by Sony Corporation) was disposed above the top surface. A sheet for application of a sample was fixed to the heat source with a double-sided adhesive tape.

The concentration of a fragrance listed in Table 1 was adjusted to 0.1% with ethanol to prepare a sample, and 50 μL of the sample or ethanol as a solvent was administered in experiment. To activate the female mosquitoes, 1% of carbon dioxide was administered from the top for 1 second, and then the heat source was brought into contact with the cage. After 30 seconds of contact, a photograph of the heat source was taken to count the number of mosquitoes attracted. The sheet used for the heat source was discarded and replaced with another sheet every time the assay was completed. In view of the influence of a sample on the mosquitoes, the number of evaluations performed for one cage was limited to (7 samples+1 control) at a maximum. The inhibitory rate relative to the number of landings with application of ethanol solvent only was calculated for one set of assays (7 samples+1 control) to determine the inhibitory effect by using the following equation.

Inhibitory rate (%)=100×(1−[number of landings with application of sample]/[number of landings with application of ethanol])       (Equation 1)

Table 2 shows the results. The compounds according to the present invention are considered to inhibit the seeking behavior of an Asian tiger mosquito for a heat source to inhibit the thermoreception response.

TABLE 1

| Name | Distributor |
|---|---|
| 3-Methyl-5-propyl-2-cyclohexen-1-one (GRAVENONE) | SYMRISE AG |
| Octahydro-5-methoxy-4,7-methano-1H-indene-2-carboxaldehyde ("SCENTENAL" (registered trademark)) | FIRMENICH SA |
| Phenoxyacetaldehyde (50% benzyl alcohol solution) | IFF INC. |
| γ-Octalactone | SIGMA-ALDRICH CO., LLC. |
| 9-Ethylidene-3-oxatricyclo(6.2.1.0$^{2,7}$)undecan-4-one ("FLOREX" (registered trademark)) | FIRMENICH SA |
| Octahydro-7-methyl-1,4-methanonaphthalen-6(2H)-one (PLICATONE) | FIRMENICH SA |
| 2,3,3-Trimethyl-2H-inden-1-one ("SAFRALEINE" (registered trademark)) | GIVAUDAN SA |
| 4-Methyl-5-thiazoleethanol | SIGMA-ALDRICH CO., LLC. |
| 7-Methoxy-3,7-dimethyloctanal | INNOSPEC |
| 3-Methyl-1-phenyl-3-pentanol | Tokyo Chemical Industry Co., Ltd. |
| 2-Phenylpropionaldehyde dimethyl acetal | SIGMA-ALDRICH CO., LLC. |
| Octahydro-2H-1-benzopyran-2-one (octahydrocoumarin) | Takasago International Corporation, |
| 2,6,6-Trimethylcyclohexa-1,3-diene-1-carbaldehyde ("safranal") | GIVAUDAN SA |
| 6-Methylquinoline | Tokyo Chemical Industry Co., Ltd. |

TABLE 2

| Sample | Inhibitory rate for seeking for heat source (%) |
|---|---|
| 3-Methyl-5-propyl-2-cyclohexen-1-one | 97.2 |
| Octahydro-5-methoxy-4,7-methano-1H-indene-2-carboxaldehyde | 89.2 |
| Phenoxyacetaldehyde | 89.0 |
| γ-Octalactone | 87.4 |
| 9-Ethylidene-3-oxatricyclo(6.2.1.0$^{2,7}$)undecan-4-one | 85.9 |
| Octahydro-7-methyl-1,4-methanonaphthalen-6(2H)-one | 81.3 |
| 2,3,3-Trimethyl-2H-inden-1-one | 76.2 |
| 4-Methyl-5-thiazoleethanol | 74.5 |
| 7-Methoxy-3,7-dimethyloctanal | 72.4 |
| 3-Methyl-1-phenyl-3-pentanol | 69.3 |
| 2-Phenylpropionaldehyde dimethyl acetal | 66.8 |
| Octahydro-2H-1-benzopyran-2-one | 93.3% |
| 2,6,6-Trimethylcyclohexa-1,3-diene-1-carbaldehyde | 91.7% |
| 6-Methylquinoline | 64.7% |

Example 2

Evaluation of Inhibition of Seeking Behavior for Human Arm

Adult Asian tiger mosquitoes consisting of 220 females and 80 males each at 5 to 10 day old were purchased from Sumika Technoservice Corporation, and released in a 30 cm×30 cm×30 cm plastic cage (bug dorm).

The concentration of each of 2,4-dimethylcyclohex-3-ene-1-methanol ("floralol", IFF Inc.) and octahydro-7-methyl-1,4-methanonaphthalen-6(2H)-one ("PLICA-TONE", Firmenich SA) as evaluation samples was adjusted to 0.4% with ethanol. A sample containing only ethanol was used as a control.

Each of the evaluation samples and control sample was sprayed 14 times in total (0.6 g) to both sides of a hand wearing a 100% cotton glove doubly.

After application of the sample, the gloved hand was left to stand for 1 minute to volatilize ethanol, and the gloved hand with the sample applied thereto was then put in the plastic cage, and the number of mosquitoes which landed on the glove was counted every 1 minute.

The numbers of landings after 1 minute, 2 minutes, and 3 minutes, and the sum total of them were counted, and the landing rate relative to the number of landings with application of the control sample as 100% was calculated. This experiment was repeated three times. Table 3 shows the results. It was demonstrated that use of the compound according the present invention in combination with floralol (2,4-dimethylcyclohex-3-ene-1-methanol) more effectively inhibits the seeking behavior of a mosquito for the human arm.

TABLE 3

| Sample | Number of landings | | | | Total landing rate (%) |
|---|---|---|---|---|---|
| | 1 min | 2 min | 3 min | total | |
| Floralol | 3 | 6 | 7 | 16 | 71.1 |
| PLICATONE | 2 | 4 | 6 | 12 | 53.3 |
| Floralol + PLICATONE | 2 | 1 | 3 | 6 | 26.7 |
| Control (average of three runs) | 6.5 | 6 | 10 | 22.5 | 100.0 |

Reference Example

Evaluation of Carbon Dioxide Response-Inhibiting Effect (1) Preparation of Asian Tiger Mosquitoes Asian tiger mosquitoes grown from eggs purchased from Sumika Technoservice Corporation were used. A transparent plastic pan was filled with water to a depth of approximately 1 cm, and a filter paper on which the eggs had been deposited was put therein. The larvae were fed with tropical fish feed (TetraMin) every day. After approximately 1 week, the pupae were collected with a dropper, and transferred into a 20 mL plastic cup, and the cup was placed in a netted cage. The adults were fed with 10 mass % sucrose contained in a 25 mL plastic tube. The males and females were kept together in one cage and allowed to mate for 5 days after eclosion. After 5 days of captivity, the adults were collected with an insect aspirator and anesthetized on ice for 5 minutes, and visually sorted into males and females to collect only the females. The wings and legs were removed from each female mosquito under anesthesia, and the female mosquito was pushed onto a double-sided adhesive tape pasted on a microscope slide with the back on the tape and thus fixed thereto, and the antennae and maxillary palpi were positioned, so as to achieve the accessibility of electrodes.

(2) Preparation of Electrodes for Recording Nerve Response

A 1 mol/L aqueous solution of potassium hydroxide was injected into a 50 mL syringe, and the syringe was horizontally fixed to a magnet stand with a clamp. A tungsten wire fixed to an electrode holder was horizontally inserted into the syringe, and polished by electrolysis under microscopic observation. A current was supplied from an AC power source to the syringe through the electrode holder via crocodile clips.

(3) Recording of Nerve Response

The Asian tiger mosquito prepared on a microscope slide was set under a microscope, and positioned so that the antennae were at the center of the view through a ×10 objective lens. A reference electrode was inserted in the eye of the insect. A pipette for providing an olfactory stimulus was placed near the maxillary palpi, and the objective lens was replaced with a ×100 objective lens. The recording electrode was brought close to the sensory hair, and carefully inserted into the sensory hair with a micromanipulator. The peg-like shape of the carbon dioxide-sensitive sensory hair of an Asian tiger mosquito can be confirmed under microscopic observation. After insertion of the electrode into the sensory hair, the spontaneous nerve firing pattern was investigated. Carbon dioxide the concentration of which had been adjusted to 0.1% was led to an olfactory stimulation apparatus via a silicone tube to stimulate the maxillary palpi for 1 second, and the carbon dioxide response was investigated.

(4) Evaluation of Carbon Dioxide Response-Inhibiting Effect

The concentration of each of the fragrances listed in Table 4 was adjusted to 1% with paraffin oil, and the resultant was used as a sample. On a filter paper (3 mm×50 mm) 15 µL of the sample was dropped, and the filter paper was inserted in a Pasteur pipette. The Pasteur pipette was connected to a stimulation apparatus via a plastic tube, and olfactory stimulation was performed for 1 second while the response to carbon dioxide in the air was monitored, and thus the carbon dioxide response-inhibiting effect was evaluated. The number of nerve firings in 1 second after stimulation with paraffin oil as a solvent and the number of nerve firings in 1 second after stimulation with each sample were counted, and the ratio was used for evaluation of the response-inhibiting effect (N=1).

Inhibitory rate (%)=100×([number of firings after stimulation with paraffin oil−number of firings after stimulation with sample]/[[number of firings after stimulation with paraffin oil])  (Equation 2)

Table 5 shows the results.

TABLE 4

| Name | Distributor |
| --- | --- |
| 2-Methoxy-4-propylphenol | SIGMA-ALDRICH CO., LLC. |
| 2-Isopropyl-4-methylthiazol | SIGMA-ALDRICH CO., LLC. |
| Isocyclocitral | GIVAUDAN SA |
| 9-Decen-1-ol | SIGMA-ALDRICH CO., LLC. |
| 1-Octen-3-ol | SIGMA-ALDRICH CO., LLC. |
| 1-Decanol | SIGMA-ALDRICH CO., LLC. |
| Ethyl 2-ethylhexanoate ("IROTYL" (registered trademark)) | Kao Corporation |
| trans-2-Hexenyl acetate | SIGMA-ALDRICH CO., LLC. |
| Ethyl 2-cyclohexylpropionate ("POIRENATE" (registered trademark)) | Kao Corporation |
| Ethyl phenylacetate | Tokyo Chemical Industry Co., Ltd. |
| 2,4,6-Trimethyl-3-cyclohexene-1-methanol | IFF INC. |
| 1-Octanol | Kao Corporation |
| 2,4-Dimethylcyclohex-3-ene-1-methanol (floralol) | IFF INC. |
| o-tert-Butylcyclohexyl acetate | Kao Corporation |
| 2-Methylbutyric acid | Tokyo Chemical Industry Co., Ltd. |
| Benzyl propionate | Tokyo Chemical Industry Co., Ltd. |
| cis-3-Hexenyl acetate | SIGMA-ALDRICH CO., LLC. |

TABLE 5

| Sample | Inhibition of carbon dioxide response (%) |
| --- | --- |
| 2-Methoxy-4-propylphenol | 95 |
| 2-Isopropyl-4-methylthiazol | 71 |
| Isocyclocitral | 61 |
| 9-Decen-1-ol | 56 |
| 1-Octen-3-ol | 55 |
| 1-Decanol | 54 |
| Ethyl 2-ethylhexanoate | 51 |
| trans-2-Hexenyl acetate | 48 |
| Ethyl 2-cyclohexylpropionate | 48 |
| Ethyl phenylacetate | 79 |
| 2,4,6-Trimethyl-3-cyclohexene-1-methanol | 61 |
| 1-Octanol | 97 |
| 2,4-Dimethylcyclohex-3-ene-1-methanol | 67 |
| o-tert-Butylcyclohexyl acetate | 87 |
| 2-Methylbutyric acid | 75 |
| Benzyl propionate | 97 |
| 3-Methyl-2-pentylcyclopent-2-en-1-one | 68 |
| cis-3-Hexenyl acetate | 50 |

What is claimed is:

1. A mosquito repellent comprising, as an active ingredient, octahydro-2H-1-benzopyran-2-one.

2. A thermoreception inhibitor for a mosquito, comprising, as an active ingredient, and octahydro-2H-1-benzopyran-2-one.

3. The mosquito repellent of claim 1, further comprising, as an active ingredient, a fragrance compound having carbon dioxide response-inhibiting action.

4. The mosquito repellent of claim 3, wherein the fragrance compound having carbon dioxide response-inhibiting action is at least one selected from the group consisting of 2,4-dimethylcyclohex-3-ene-1-methanol, 1-octanol, and cis-3-hexenyl acetate.

5. A method for repelling a mosquito, comprising applying octahydro-2H-1-benzopyran-2-one onto the skin of a mammal.

6. The method for repelling a mosquito of claim 5, comprising applying octahydro-2H-1-benzopyran-2-one and a fragrance compound having carbon dioxide response-inhibiting action onto the skin of a mammal.

7. The method for repelling a mosquito of claim 6, wherein the fragrance compound having carbon dioxide response-inhibiting action is at least one selected from the group consisting of 2,4-dimethylcyclohex-3-ene-1-methanol, 1-octanol, and cis-3-hexenyl acetate.

8. A method for repelling a mosquito, comprising attaching or holding octahydro-2H-1-benzopyran-2-one on an apparel article directly or indirectly contacting the skin.

9. The method for repelling a mosquito of claim 8, comprising attaching or holding octahydro-2H-1-benzopyran-2-one and a fragrance compound having carbon dioxide response-inhibiting action on an apparel article directly or indirectly contacting the skin.

10. The method for repelling a mosquito of claim 9, wherein the fragrance compound having carbon dioxide response-inhibiting action is at least one selected from the group consisting of 2,4-dimethylcyclohex-3-ene-1-methanol, 1-octanol, and cis-3-hexenyl acetate.

11. A method for repelling a mosquito, comprising spreading octahydro-2H-1-benzopyran-2-one in a defined space.

12. The method for repelling a mosquito of claim 11, comprising spreading octahydro-2H-1-benzopyran-2-one and a fragrance compound having carbon dioxide response-inhibiting action in a defined space.

13. The method for repelling a mosquito of claim 12, wherein the fragrance compound having carbon dioxide response-inhibiting action is at least one selected from the group consisting of 2,4-dimethylcyclohex-3-ene-1-methanol, 1-octanol, and cis-3-hexenyl acetate.

* * * * *